United States Patent
Gupta et al.

(10) Patent No.: US 11,136,900 B2
(45) Date of Patent: Oct. 5, 2021

(54) TURBINE AND TURBOCHARGER

(71) Applicant: MITSUBISHI HEAVY INDUSTRIES ENGINE & TURBOCHARGER, LTD., Sagamihara (JP)

(72) Inventors: Bipin Gupta, Tokyo (JP); Toyotaka Yoshida, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 16/771,465

(22) PCT Filed: Dec. 20, 2017

(86) PCT No.: PCT/JP2017/045706
§ 371 (c)(1),
(2) Date: Jun. 10, 2020

(87) PCT Pub. No.: WO2019/123566
PCT Pub. Date: Jun. 27, 2019

(65) Prior Publication Data
US 2020/0362721 A1 Nov. 19, 2020

(51) Int. Cl.
*F01D 17/16* (2006.01)
*F02B 37/24* (2006.01)

(52) U.S. Cl.
CPC .............. *F01D 17/16* (2013.01); *F02B 37/24* (2013.01); *F05D 2220/40* (2013.01)

(58) Field of Classification Search
CPC ........ F01D 17/16; F01D 17/165; F02B 37/24; F05D 2220/40; F02C 6/12
(Continued)

(56) References Cited

U.S. PATENT DOCUMENTS

| | | | | |
|---|---|---|---|---|
| 3,243,159 A | * | 3/1966 | Hefler | ............. F04D 29/462 |
| | | | | 415/156 |
| 2007/0204615 A1 | * | 9/2007 | Vrbas | ............. F02B 37/013 |
| | | | | 60/602 |

(Continued)

FOREIGN PATENT DOCUMENTS

JP 2013-137017 A 7/2013

OTHER PUBLICATIONS

International Search Report, issued in PCT/JP2017/045706, dated Mar. 20, 2018.
(Continued)

*Primary Examiner* — Hoang M Nguyen
(74) *Attorney, Agent, or Firm* — Birch, Stewart, Kolasch & Birch, LLP

(57) ABSTRACT

A turbine includes: a turbine impeller; a housing disposed so as to enclose the turbine impeller and including a scroll passage positioned on an outer circumferential side of the turbine impeller; a nozzle vane disposed inside an intermediate flow passage which is positioned, in an exhaust gas flow direction, on a downstream side of the scroll passage and on an upstream side of the turbine impeller; a plate disposed on a side of the intermediate flow passage with respect to an inner circumferential wall part of the housing, defining an inner circumferential boundary of the scroll passage, so as to face the intermediate flow passage such that a gap is formed between the plate and the inner circumferential wall part in an axial direction; and at least one guide vane disposed in the gap between the inner circumferential wall part and the plate in the axial direction. The at least one guide vane includes: a first end; and a second end disposed radially on an outer side of the first end and circumferentially downstream of the first end in the exhaust gas flow direction.

8 Claims, 5 Drawing Sheets

(58) Field of Classification Search
USPC ........ 415/203–205, 208.2–208.5, 211.1, 224
See application file for complete search history.

(56) References Cited

U.S. PATENT DOCUMENTS

2010/0310365 A1* 12/2010 Matsuyama .......... F01D 11/005
　　　　　　　　　　　　　　　　　　　　　　　　　415/212.1
2014/0341729 A1　　11/2014　Osako et al.
2015/0184541 A1*　7/2015　Iizuka ................... F16C 33/121
　　　　　　　　　　　　　　　　　　　　　　　　　415/229

OTHER PUBLICATIONS

Written Opinion of the International Searching Authority, issued in PCT/JP2017/045708, dated Mar. 20, 2018.

* cited by examiner

TURBINE AND TURBOCHARGER

TECHNICAL FIELD

The present disclosure relates to a turbine and a turbocharger.

BACKGROUND

A turbocharger including nozzle vanes for adjusting flow of exhaust gas flowing into a turbine impeller has been used.

For example, Patent Document 1 discloses a turbocharger using a radial turbine including a plurality of nozzle vanes arranged in a circumferential direction inside a scroll through which a working gas (exhaust gas) passes. The nozzle vane used in this turbocharger has opposite nozzle-vane widthwise ends which protrude toward a pressure surface side more prominently at a leading edge and a trailing edge than at a middle portion. With such a shape of the nozzle vane, collision loss of the working gas is reduced on the leading edge side, and the flow of working gas flowing out from the nozzle is uniformized on the trailing edge side, so as to reduce the secondary flow loss at the nozzle vane and the blade.

CITATION LIST

Patent Literature

Patent Document 1: JP2013-137017A

SUMMARY

Problems to be Solved

As a result of intensive studies by the present inventors, it has been found that, during operation of a turbocharger including nozzle vanes, turbulence of flow increases in a gap formed between a housing wall surface forming a scroll passage and a plate forming an intermediate flow passage in which the nozzle vanes are arranged, resulting in an increase in heat transfer rate between a fluid and the housing or a decrease in total pressure. Such increase in heat transfer rate and decrease in total pressure indicate the occurrence of heat loss and pressure loss in the turbine. It is thus desired to reduce such heat loss and pressure loss.

In view of the above, an object of at least one embodiment of the present invention is to provide a turbine and a turbocharger whereby it is possible to reduce heat loss and pressure loss due to turbulence of flow.

Solution to the Problems (1) A turbine according to at least one embodiment of the present invention comprises: a turbine impeller; a housing disposed so as to enclose the turbine impeller and including a scroll passage positioned on an outer circumferential side of the turbine impeller; a nozzle vane disposed inside an intermediate flow passage which is positioned, in an exhaust gas flow direction, on a downstream side of the scroll passage and on an upstream side of the turbine impeller; a plate disposed on a side of the intermediate flow passage with respect to an inner circumferential wall part of the housing, which defines an inner circumferential boundary of the scroll passage, so as to face the intermediate flow passage such that a gap is formed between the plate and the inner circumferential wall part in an axial direction; and at least one guide vane disposed in the gap between the inner circumferential wall part and the plate in the axial direction. The at least one guide vane includes: a first end; and a second end disposed radially on an outer side of the first end and circumferentially downstream of the first end in the exhaust gas flow direction.

With the above configuration (1), since the guide vane including the first end and the second end disposed radially on the outer side of the first end and circumferentially downstream of the first end in the exhaust gas flow direction is disposed in the gap between the inner circumferential wall part and the plate, the flow from the scroll passage into the gap is guided by the guide vane radially outward and circumferentially downstream in the exhaust gas flow direction. Thus, exhaust gas flowing through the scroll passage is prevented from flowing into the gap, so that it is possible to prevent turbulence of flow which may occur by inflow of exhaust gas to the gap. Consequently, it is possible to reduce heat loss or pressure loss due to turbulence of flow in the turbine.

(2) In some embodiments, in the above configuration (1), the at least one guide vane is provided so as to protrude in the axial direction from a surface of at least one of the inner circumferential wall part or the plate toward the other of the inner circumferential wall part or the plate.

With the above configuration (2), since the guide vane is provided with an axial height between the plate and the inner circumferential wall part forming the gap in the axial direction, it is possible to effectively suppress inflow of exhaust gas from the scroll passage to the gap.

(3) In some embodiments, in the above configuration (1) or (2), the first end is positioned in an inner circumferential end portion of the gap, and the second end is positioned in an outer circumferential end portion of the gap.

With the above configuration (3), since the first end of the guide vane is positioned in the inner circumferential end portion of the gap, when exhaust gas flows into an inner circumferential region of the gap, the exhaust gas is easily guided to the outer circumferential side along the guide vane. Further, since the second end of the guide vane is positioned in the outer circumferential end portion of the gap, the exhaust gas is guided so as to flow on the outer circumferential side with respect to the gap. Thus, it is possible to effectively suppress inflow of exhaust gas from the scroll passage to the gap.

(4) In some embodiments, in any one of the above configurations (1) to (3), the at least one guide vane has a curved shape convex toward the scroll passage in a cross-section perpendicular to the axial direction.

With the above configuration (4), since the guide vane has a curved shape convex toward the scroll passage in a cross-section perpendicular to the axial direction, exhaust gas flowing from the scroll passage is prevented from remaining in the gap, and the exhaust gas is smoothly guided radially outward and downstream along the guide vane. Thus, it is possible to effectively suppress inflow of exhaust gas from the scroll passage to the gap.

(5) In some embodiments, in any one of the above configurations (1) to (4), the at least one guide vane includes a plurality of guide vanes arranged in a circumferential direction, and at least one of the plurality of guide vanes has a length in the circumferential direction which is larger than a length in the circumferential direction of a guide vane disposed on a circumferentially upstream side in the exhaust gas flow direction with respect to the at least one guide vane.

In a typical turbine, the length of the above-described clearance in the radial direction increases with distance circumferentially downstream in the exhaust gas flow direction. With the above configuration (5), since the guide vanes on more circumferentially downstream side in the exhaust gas flow direction have larger length in the circumferential direction in accordance with the increase in length of the clearance in the radial direction, it is possible to effectively suppress inflow of exhaust gas from the scroll passage to the gap by the guide vanes disposed in respective circumferential-directional regions.

(6) In some embodiments, in any one of the above configurations (1) to (5), the at least one guide vane has an axial height of not less than 30% of an axial height of the gap.

With the above configuration (6), since the guide vane has an axial height of not less than 30% of an axial height of the gap, it is possible to effectively suppress inflow of exhaust gas from the scroll passage to the gap.

(7) In some embodiments, in any one of the above configurations (1) to (6), in a cross-section perpendicular to the axial direction, when a rotational axis of the turbine is taken as a center, an angle at a position of a tongue of the scroll passage is defined as 0 degree, and the exhaust gas flow direction in a circumferential direction is taken as a positive angular direction, the at least one guide vane is positioned within a range of at least 220 degrees and at most 360 degrees.

According to findings of the present inventors, it has been found that in the vicinity of the outlet of the scroll passage, turbulence of flow particularly increases, so that the heat transfer rate between the fluid and the housing tends to increase, and the total pressure in the housing tends to decrease.

In this regard, with the above configuration (7), since the guide vane is provided within the range in which the above-described angle in the circumferential direction is at least 220 degrees and at most 360 degrees (i.e., in the vicinity of the outlet of the scroll passage), in this circumferential region, the exhaust gas is guided by the guide vane so as to flow radially outward and downstream. Thus, in this circumferential region, exhaust gas flowing through the scroll passage is prevented from entering the gap. Consequently, it is possible to effectively reduce heat loss or pressure loss in the turbine.

(8) A turbocharger according to at least one embodiment of the present invention comprises a turbine described in any one of the above (1) to (7) and a compressor configured to be driven by the turbine.

With the above configuration (8), since the guide vane including the first end and the second end disposed radially on the outer side of the first end and circumferentially downstream of the first end in the exhaust gas flow direction is disposed in the gap between the inner circumferential wall part and the nozzle plate, the flow from the scroll passage into the gap is guided by the guide vane radially outward and circumferentially downstream in the exhaust gas flow direction. Thus, exhaust gas flowing through the scroll passage is prevented from flowing into the gap, so that it is possible to prevent turbulence of flow which may occur by inflow of exhaust gas to the gap. Consequently, it is possible to reduce heat loss or pressure loss due to turbulence of flow in the turbine.

Advantageous Effects

At least one embodiment of the present invention provides a turbine and a turbocharger whereby it is possible to reduce heat loss of pressure loss due to turbulence of flow.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

First, an overall configuration of a turbocharger according to some embodiments will be described.

Figure 1:
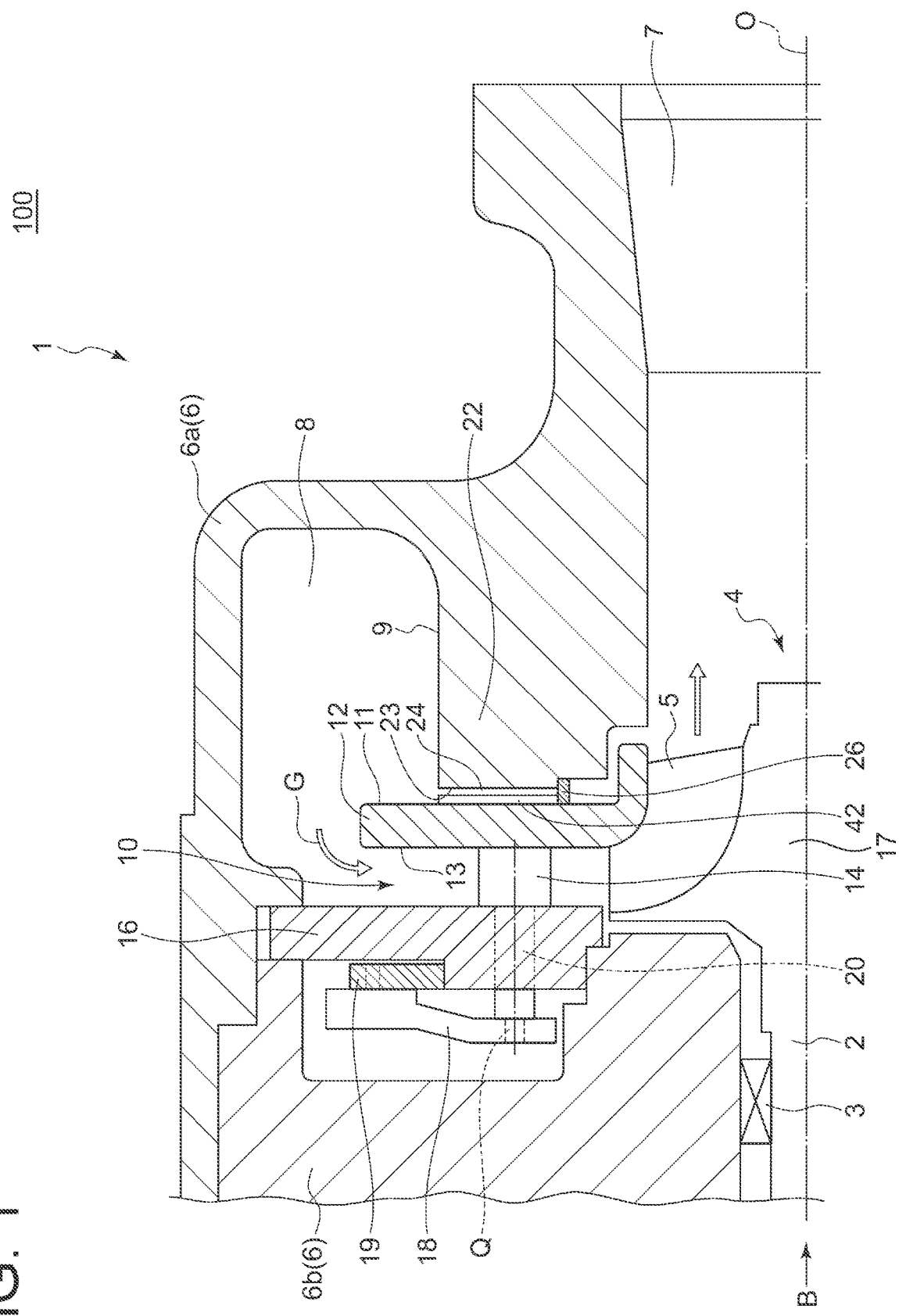
FIG. 1 is a schematic cross-sectional view of a turbocharger according to an embodiment, taken along the rotational axis.

FIG. 1 is a schematic cross-sectional view of a turbocharger according to an embodiment, taken along the rotational axis O. As shown in FIG. 1, the turbocharger 100 includes a turbine 1 having a turbine impeller 4 configured to be rotationally driven by exhaust gas from an engine (not shown) and a compressor (not shown) connected to the turbine 1 via a rotational shaft 2 rotatably supported by a bearing 3. The compressor is configured to be coaxially driven by rotation of the turbine impeller 4 to compress intake air flowing into the engine.

The turbine 1 shown in FIG. 1 is a radial turbine in which exhaust gas as a working fluid enters in the radial direction. However, the operation system of the turbine 1 is not limited thereto. For example, in some embodiments, the turbine 1 may be a mixed flow turbine in which an entering working fluid has velocity components in the radial direction and the axial direction.

The turbine impeller 4 is housed in a housing 6 disposed so as to enclose the turbine impeller 4, and includes a hub 17 connected to the rotational shaft 2 and a plurality of blades 5 arranged in the circumferential direction on an outer circumferential surface of the hub 17.

The housing 6 includes a scroll passage 8 positioned on an outer circumferential side of the turbine impeller 4 and an inner circumferential wall part 22 defining an inner circumferential boundary 9 of the scroll passage 8. As shown in FIG. 1, the housing 6 may include a turbine housing 6a which is a portion housing the turbine impeller 4 and a bearing housing 6b which is a portion housing the bearing 3.

On the outer circumferential side of the turbine impeller 4, an intermediate flow passage 10 through which exhaust gas flows from the scroll passage 8 into the turbine impeller 4 is formed. In other words, the intermediate flow passage 10 is positioned, in the exhaust gas flow direction, downstream of the scroll passage 8 and upstream of the turbine impeller 4.

Inside the intermediate flow passage 10, a plurality of nozzle vanes 14 for adjusting exhaust gas flow entering the turbine impeller 4 is arranged in the circumferential direction.

The intermediate flow passage 10 is formed between a nozzle mount 16 to which the nozzle vanes 14 are mounted and a nozzle plate 12 (plate in the present invention) disposed on the opposite side across the nozzle vanes 14 in the axial direction of the turbine 1 (hereinafter also simply referred to as "axial direction"). The nozzle mount 16 is fixed to the bearing housing 6b with a bolt (not shown) or the like. Between the nozzle mount 16 and the nozzle plate 12, for example, a pillar material (not shown) extending in the axial direction is disposed. The pillar material supports the nozzle plate 12 spaced from the nozzle mount 16 in the axial direction. Between the nozzle plate 12 and the inner circumferential wall part 22 of the housing 6, an annular seal member 26 is disposed so as to suppress leakage of exhaust gas from the scroll passage 8 to a space downstream of the turbine impeller 4 (i.e., leakage of exhaust gas not via the turbine impeller 4).

The nozzle vane 14 includes an airfoil portion extending between the nozzle mount 16 and the nozzle plate 12.

Each of the plurality of nozzle vanes 14 is connected to one end of a lever plate 18 via a nozzle shaft 20. Further, the other end of the lever plate 18 is connected to a disc-shaped drive ring 19.

The drive ring 19 is driven by an actuator (not shown) so as to be rotatable around the rotational axis O. When the drive ring 19 rotates, each lever plate 18 rotates. Accordingly, the nozzle shaft 20 rotates around a rotation axis Q along the axial direction, so that the opening degree (blade angle) of the nozzle vane 14 is changed via the nozzle shaft 20.

In the turbine 1 of the turbocharger 100 having this configuration, exhaust gas entering from an inlet flow passage 30 (see FIG. 2) into the scroll passage 8 (see arrow G of FIGS. 1 and 2) flows into the intermediate flow passage 10 between the nozzle mount 16 and the nozzle plate 12, in which the nozzle vanes 14 control the flow direction of the gas so as to flow into a central portion of the housing 6. Then, after acting on the turbine impeller 4, the exhaust gas is discharged to the outside from an exhaust outlet 7.

Further, the exhaust gas passage area inside the housing 6 may be changed by appropriately changing the opening degree of the nozzle vanes 14 in accordance with exhaust gas amount entering the turbine 1 to adjust the flow velocity of exhaust gas into the turbine impeller 4. Thus, it is possible to obtain excellent turbine efficiency.

Hereinafter, characteristics of the turbine 1 according to some embodiments will be described.

Figure 2:
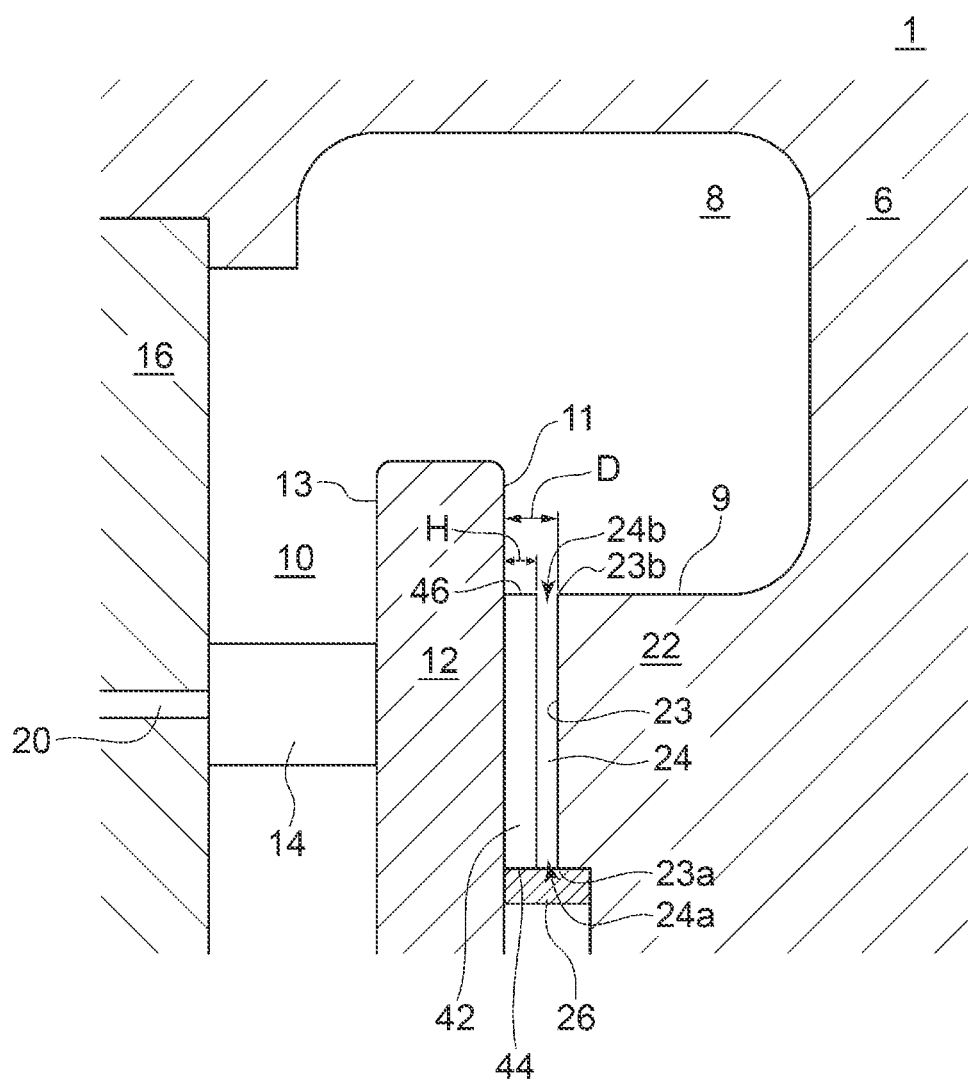
FIG. 2 is a partial enlarged view of FIG. 1.
Figure 3:
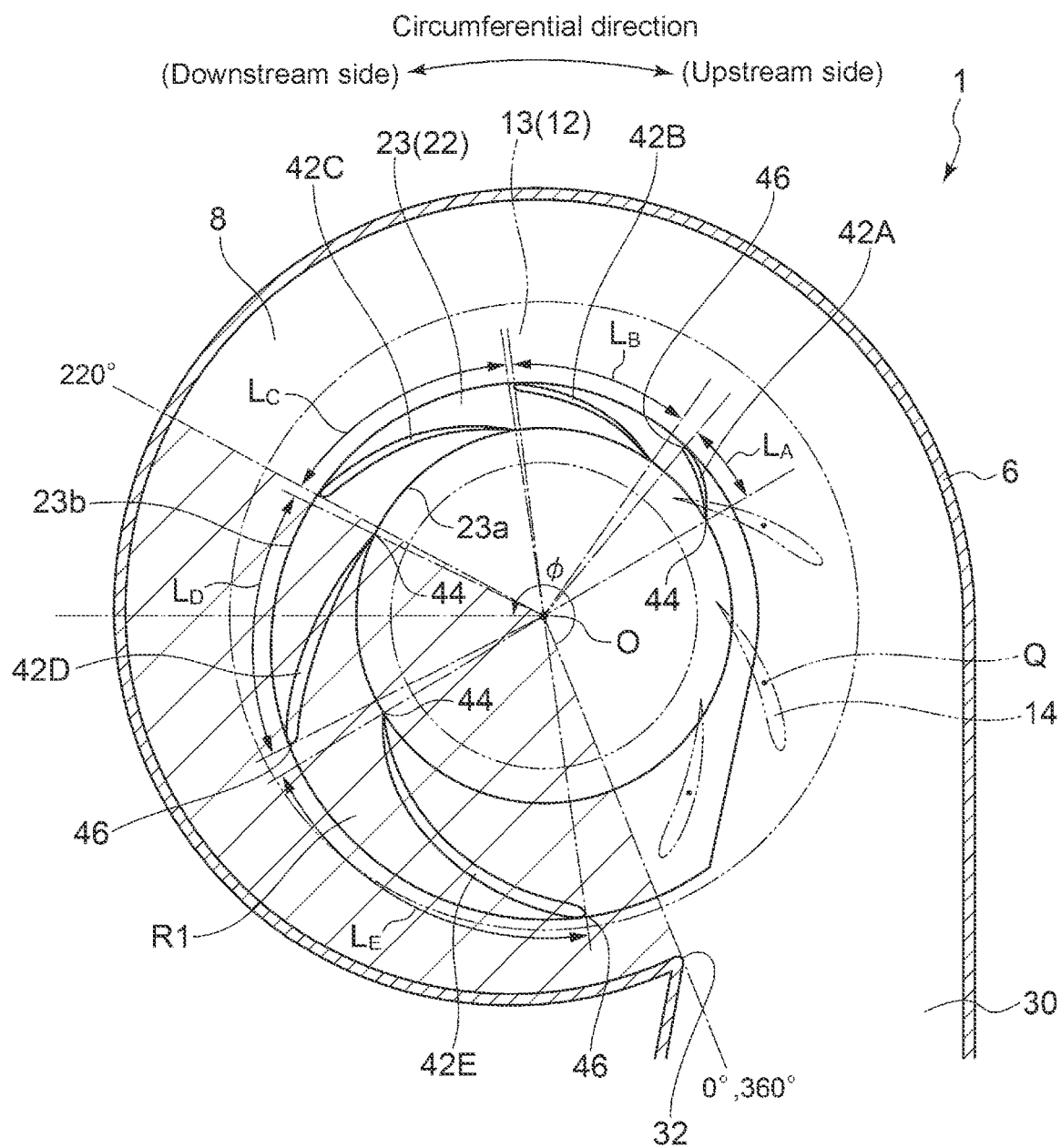
FIG. 3 is a schematic cross-sectional view of the turbine shown in FIG. 1, perpendicular to the rotational axis.

FIG. 2 is a partial enlarged view of FIG. 1. FIG. 3 is a schematic cross-sectional view of the turbine 1 shown in FIG. 1, perpendicular to the rotational axis O. FIG. 3 is a diagram of the turbine 1 viewed in the direction of the arrow B shown in FIG. 1, and shows a cross-section of a portion including the scroll passage 8 of the housing 6, a nozzle plate 12, nozzle vanes 14, and guide vanes 42 (42A to 42E) described later, but some components such as the turbine impeller 4 are not depicted for simplification of description.

As shown in FIG. 2, the nozzle plate 12 (plate) is disposed on a side of the intermediate flow passage 10 with respect to the inner circumferential wall part 22 of the housing 6 so as to face the intermediate flow passage 10 such that a gap 24 is formed between the nozzle plate 12 and the inner circumferential wall part 22 in the axial direction. Further, the turbine 1 include at least one guide vane disposed in the gap 24. In the illustrated embodiment, as shown in FIG. 3, a plurality of guide vanes 42 (42A to 42E) is arranged along the circumferential direction in the gap 24 of the turbine 1. Hereinafter, the plurality of guide vanes 42A to 42E is also collectively referred to as the guide vane 42.

As shown in FIGS. 2 and 3, each guide vane 42 includes a first end 44 and a second end 46 disposed radially on an outer side of the first end 44 and circumferentially downstream of the first end 44 in the exhaust gas flow direction.

According to the above embodiment, since the guide vane 42 is disposed in the gap 24 between the inner circumferential wall part 22 and the nozzle plate 12, the flow of exhaust gas from the scroll passage 8 into the gap 24 is guided by the guide vane 42 radially outward and circumferentially downstream in the exhaust gas flow direction. Thus, exhaust gas flowing through the scroll passage 8 is prevented from flowing into the gap 24, so that it is possible to prevent turbulence of flow which may occur by inflow of exhaust gas to the gap 24. Consequently, it is possible to reduce heat loss or pressure loss due to turbulence of flow in the turbine 1.

In some embodiments, the guide vane 42 is provided so as to protrude in the axial direction from a surface of at least one of the inner circumferential wall part 22 or the nozzle plate 12 toward the other of the inner circumferential wall part 22 or the nozzle plate 12.

For example, in the exemplary embodiment shown in FIG. 2, the gap 24 is formed between a surface 23 of the inner circumferential wall part 22 along a direction perpendicular to the rotational axis O and one of opposite surfaces 11, 13 of the nozzle plate 12, namely, the surface 11 facing the surface 23 of the inner circumferential wall part 22. Further, the guide vane 42 is provided so as to protrude in the axial direction from the surface 11 of the nozzle plate 12 toward the inner circumferential wall part 22.

In some embodiments, the guide vane 42 may be provided so as to protrude in the axial direction from the surface 23 of the inner circumferential wall part 22 toward the nozzle plate 12. Alternatively, in some embodiments, the guide vane 42 may be provided so as to protrude in the axial direction from the surface 23 of the inner circumferential wall part 22 and the surface 11 of the nozzle plate 12.

In this case, since the guide vane 42 is provided with an axial height between the nozzle plate 12 and the inner circumferential wall part 22 forming the gap 24 in the axial direction, it is possible to effectively suppress inflow of exhaust gas from the scroll passage 8 to the gap 24.

The guide vane 42 may have an axial height H (see FIG. 2) of not less than 30% of an axial height D of the gap 24.

Thus, since the guide vane 42 has an axial height H of not less than 30% of an axial height D of the gap 24, it is possible to effectively suppress inflow of exhaust gas from the scroll passage 8 to the gap 24.

In some embodiments, the first end 44 of the guide vane 42 is positioned in an inner circumferential end portion 24a of the gap 24, and the second end 46 of the guide vane 42 is positioned in an outer circumferential end portion 24b of the gap 24.

For example, in the case of the illustrated embodiment, as shown in FIG. 2, the gap 24 is formed in a radial-directional region corresponding to the range of extension of the inner circumferential wall part 22 in the radial direction. Accordingly, as shown in FIGS. 2 and 3, the inner circumferential end portion 24a of the gap 24 is a portion of the gap 24 including the position of an inner circumferential end 23a of the surface 23 of the inner circumferential wall part 22 in the radial direction, and the outer circumferential end portion 24b of the gap 24 is a portion of the gap 24 including the position of an outer circumferential end 23b of the surface 23 of the inner circumferential wall part 22 in the radial direction.

Thus, since the first end 44 of the guide vane 42 is positioned in the inner circumferential end portion 24a of the gap 24, when exhaust gas flows into an inner circumferential region of the gap 24, the exhaust gas is easily guided to the outer circumferential side along the guide vane 42. Further, since the second end 46 of the guide vane 42 is positioned in the outer circumferential end portion 24b of the gap 24, the exhaust gas is guided so as to flow on the outer circumferential side with respect to the gap 24. Thus, it is possible to effectively suppress inflow of exhaust gas from the scroll passage 8 to the gap 24.

In some embodiments, the guide vane 42 has a curved shape convex toward the scroll passage 8 in a cross-section perpendicular to the axial direction. In other words, in some embodiments, the guide vane 42 has a concave curved shape in a cross-section perpendicular to the axial direction, when viewed from the rotational axis O to the radially outer side.

For example, in the illustrated embodiment, as shown in FIG. 3, each of the guide vanes 42A to 42E has a curved shape convex toward the scroll passage 8.

Thus, since the guide vane 42 has a curved shape convex toward the scroll passage 8 in a cross-section perpendicular to the axial direction, exhaust gas flowing from the scroll passage 8 is prevented from remaining in the gap 24, and the exhaust gas is smoothly guided radially outward and downstream along the guide vane 42. Thus, it is possible to effectively suppress inflow of exhaust gas from the scroll passage 8 to the gap 24.

In some embodiments, at least one guide vane 42 of the plurality of guide vanes 42 has a length in the circumferential direction which is larger than a length in the circumferential direction of a guide vane 42 disposed on the circumferentially upstream side in the exhaust gas flow direction with respect to the at least one guide vane 42.

For example, in the turbine 1 shown in FIG. 3, among the plurality of guide vanes 42A to 42E, the guide vane 42E has a length $L_E$ in the circumferential direction which is larger than lengths $L_A$ to $L_D$ in the circumferential direction of the guide vanes 42A to 42D disposed upstream of the guide vane 42E. In the turbine 1 shown in FIG. 3, the guide vanes 42A to 42E positioned more downstream in the exhaust gas flow direction have larger length in the circumferential direction. In other words, the lengths $L_A$ to $L_E$ of the guide vanes 42A to 42E in the circumferential direction satisfy $L_A < L_B < L_C < L_D < L_E$.

In a typical turbine, the length of the gap 24 in the radial direction increases with distance circumferentially downstream in the exhaust gas flow direction.

For example, in the exemplary embodiment shown in FIG. 3, the position of the inner circumferential end 23a of the surface 23 of the inner circumferential wall part 22 in the radial direction does not significantly change over the entire circumference, whereas the position of the outer circumferential end 23b in the radial direction changes outward with distance circumferentially downstream in the exhaust gas flow direction. Accordingly, in the embodiment shown in FIG. 3, the length of the gap 24 in the radial direction increases with distance circumferentially downstream in the exhaust gas flow direction.

In this regard, according to the above embodiment, the guide vanes 42 on more circumferentially downstream side in the exhaust gas flow direction have larger length in the circumferential direction in accordance with the increase in length of the gap 24 in the radial direction. Thus, it is possible to effectively suppress inflow of exhaust gas from the scroll passage 8 to the gap 24 by the guide vanes 42 disposed in respective circumferential-directional regions.

In some embodiments, in a cross-section perpendicular to the axial direction, when the rotational axis O of the turbine 1 is taken as a center, an angle at a position of a scroll tongue 32 is defined as 0 degree (see FIG. 3), and the exhaust gas flow direction in the circumferential direction is taken as a positive angular direction, at least one guide vane 42 is positioned within a range of at least 220 degrees and at most 360 degrees. The range R1 shown by the hatched area in FIG. 3 represents this angular range (at least 220 degrees and at most 360 degrees), and the angle Φ represents an example of angle within this range. The scroll tongue 32 is a connection portion between the start and end of a scroll part of the housing 6 forming the scroll passage 8.

For example, in the exemplary embodiment shown in FIG. 3, among the plurality of guide vanes 42A to 42E, the guide vanes 42D, 42E are positioned within the angular range R1.

According to findings of the present inventors, it has been found that in the vicinity of the outlet of the scroll passage 8, turbulence of flow particularly increases, so that the heat transfer rate between the fluid (exhaust gas) and the housing 6 tends to increase, and the total pressure in the housing 6 tends to decrease.

In this regard, according to the above embodiment, since at least one guide vane 42 is provided within the range R1 in which the above-described angle in the circumferential direction is at least 220 degrees and at most 360 degrees (i.e., in the vicinity of the outlet of the scroll passage 8), in this circumferential region, the exhaust gas is guided by the guide vane 42 so as to flow radially outward and downstream. Thus, in this circumferential region, exhaust gas flowing through the scroll passage 8 is prevented from entering the gap 24. Consequently, it is possible to effectively reduce heat loss or pressure loss in the turbine 1.

FIGS. 4A to 4F are schematic views of the guide vane 42 according to an embodiment in a cross-section including the circumferential direction and the axial direction.

The shape of the guide vane 42 in a cross-section including the circumferential direction and the axial direction is not limited to a particular shape, and may have various shape, for example, as shown in FIGS. 4A to 4F.

Figure 4A:
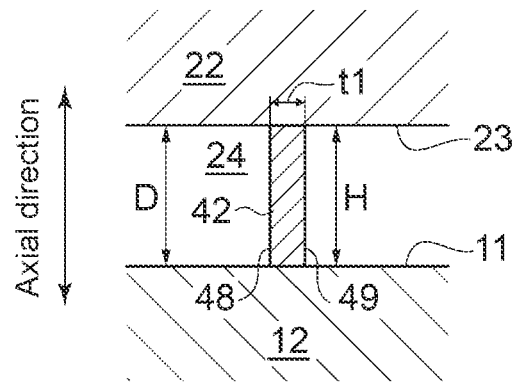
FIG. 4A is a schematic view of a guide vane according to an embodiment in a cross-section including the circumferential direction and the axial direction.

For example, in the embodiment shown in FIG. 4A, one end of the guide vane 42 in the axial direction is connected to the surface 23 of the inner circumferential wall part 22, and the other end is connected to the surface 11 of the nozzle plate 12. In other words, the guide vane 42 is provided so as to protrude in the axial direction from the surface 23 of the inner circumferential wall part 22 and the surface 11 of the nozzle plate 12. In this embodiment, the guide vane 42 has an axial height H equal to an axial height D of the gap 24.

Alternatively, in the embodiments shown in FIGS. 4B to 4F, one end of the guide vane 42 in the axial direction is connected to the surface 11 of the nozzle plate 12, and the guide vane 42 is provided so as to protrude in the axial direction from the surface 11 of the nozzle plate 12 toward the inner circumferential wall part 22. In these embodiments, the guide vane 42 has an axial height H smaller than an axial height D of the gap 24.

Further alternatively, although not depicted, in some embodiments, one end of the guide vane 42 in the axial direction may be connected to the surface 23 of the inner circumferential wall part 22, and the guide vane 42 may be provided so as to protrude in the axial direction from the surface 23 of the inner circumferential wall part 22 toward the nozzle plate 12. In this case, the guide vane 42 has an axial height H smaller than an axial height D of the gap 24.

In the embodiments shown in FIGS. 4A to 4D, the thickness of the guide vane 42 in the circumferential direction is constant at t1 in the axial direction.

Figure 4B:
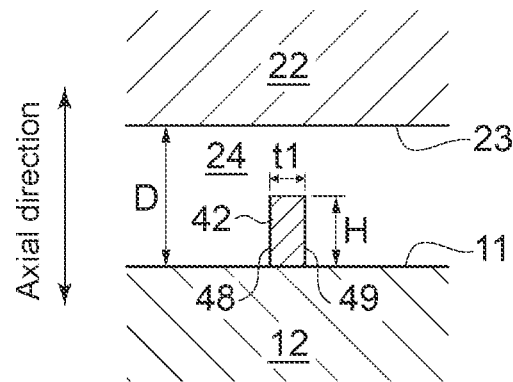
FIG. 4B is a schematic view of a guide vane according to an embodiment in a cross-section including the circumferential direction and the axial direction.
Figure 4C:
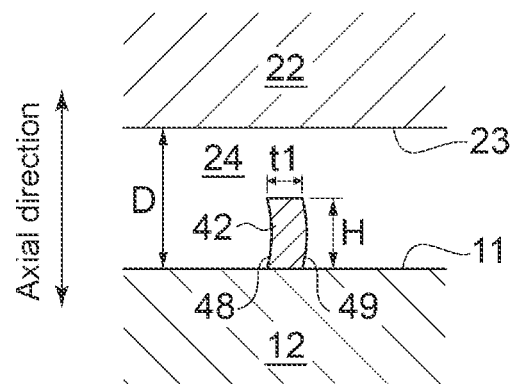
FIG. 4C is a schematic view of a guide vane according to an embodiment in a cross-section including the circumferential direction and the axial direction.
Figure 4D:
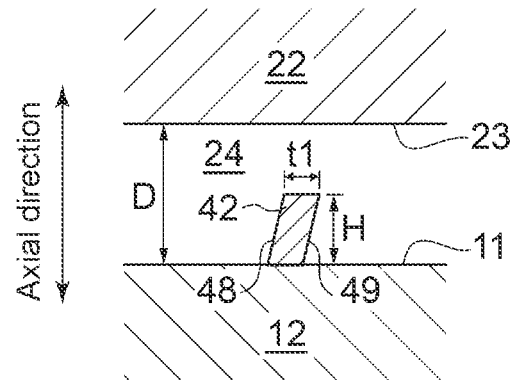
FIG. 4D is a schematic view of a guide vane according to an embodiment in a cross-section including the circumferential direction and the axial direction.
Figure 4E:
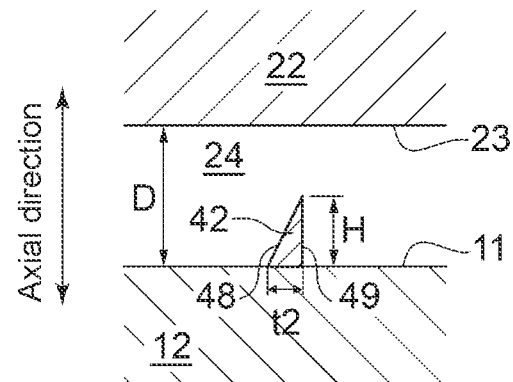
FIG. 4E is a schematic view of a guide vane according to an embodiment in a cross-section including the circumferential direction and the axial direction.
Figure 4F:
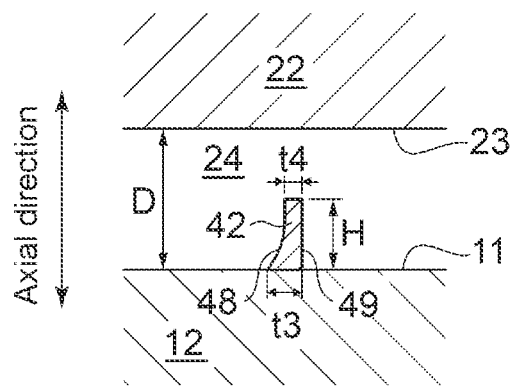
FIG. 4F is a schematic view of a guide vane according to an embodiment in a cross-section including the circumferential direction and the axial direction.

In some embodiments, as shown in FIGS. 4E and 4F, the thickness of the guide vane 42 in the circumferential direction may vary with position in the axial direction. For example, in the embodiments shown in FIGS. 4E, 4F, the guide vane 42 has a thickness t2 in the circumferential direction at the end adjacent to the nozzle plate 12, and the thickness of the guide vane 42 decreases as the inner circumferential wall part 22 gets closer in the axial direction, and the thickness is minimum at the end adjacent to the inner circumferential wall part 22. More specifically, the thickness of the guide vane 42 at the end adjacent to the inner circumferential wall part 22 is zero in the embodiment shown in FIG. 4E, and t3 (t3<t2) in the embodiment shown in FIG. 4F.

The shape of a pair of side surfaces 48, 49 (see FIGS. 4A to 4F) of the guide vane 42 extending along the axial direction may include a straight line or may include a curved line in a cross-section including the circumferential direction and the axial direction.

In some embodiments, for example as shown in FIGS. 4A, 4B, and 4E, at least one of the pair of side surfaces 48, 49 may include a straight line extending along the axial direction.

In some embodiments, for example as shown in FIGS. 4D and 4E, at least one of the pair of side surfaces 48, 49 may include a straight line extending obliquely with respect to the axial direction. In the exemplary embodiments shown in FIGS. 4D and 4E, at least one of the pair of side surfaces 48, 49 includes a straight line extending obliquely toward the circumferentially upstream side in the exhaust gas flow direction from the nozzle plate 12 to the inner circumferential wall part 22 in the axial direction. In other embodiments, at least one of the pair of side surfaces 48, 49 may include straight line extending obliquely toward the circumferentially downstream side in the exhaust gas flow direction from the nozzle plate 12 to the inner circumferential wall part 22 in the axial direction.

In some embodiments, for example as shown in FIGS. 4A, 4B, and 4D, the pair of side surfaces 48, 49 may include straight lines substantially parallel to each other.

In some embodiments, for example as shown in FIGS. 4C and 4F, at least one of the pair of side surfaces 48, 49 may include a curved line convex toward the circumferentially upstream side or downstream side in the exhaust gas flow direction. In the exemplary embodiment shown in FIG. 4C, each of the side surfaces 48, 49 includes a curved line convex toward the circumferentially upstream side in the exhaust gas flow direction. In the exemplary embodiment shown in FIG. 4F, among the pair of side surfaces 48, 49, the side surface 48, which is positioned on the circumferentially downstream side, includes a curved line convex toward the circumferentially upstream side in the exhaust gas flow direction, and the side surface 49 includes a straight line along the axial direction.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

REFERENCE SIGNS LIST

1 Turbine
2 Rotational shaft
3 Bearing
4 Turbine impeller
5 Blade
6 Housing
6a Turbine housing
6b Bearing housing
7 Exhaust outlet
8 Scroll passage
9 Inner circumferential boundary
10 Intermediate flow passage
11 Surface
12 Nozzle plate
13 Surface
14 Nozzle vane
16 Nozzle mount
17 Hub
18 Lever plate
19 Drive ring
20 Nozzle shaft
22 Inner circumferential wall part
23 Surface
23a Inner circumferential end
23b Outer circumferential end
24 Gap
24a Inner circumferential end portion
24b Outer circumferential end portion
26 Seal member
30 Inlet flow passage
32 Scroll tongue
34 Leading edge
36 Trailing edge
38 Pressure surface
40 Suction surface
42, 42A to 42F Guide vane
44 First end
46 Second end
48 Side surface 49 Side surface
100 Turbocharger
O Rotational axis
Q Rotation axis

The invention claimed is:

1. A turbine, comprising:
a turbine impeller;
a housing disposed so as to enclose the turbine impeller, the housing including a scroll passage positioned on an outer circumferential side of the turbine impeller;
a nozzle vane disposed inside an intermediate flow passage which is positioned, in an exhaust gas flow direction, on a downstream side of the scroll passage and on an upstream side of the turbine impeller;
a plate disposed on a side of the intermediate flow passage with respect to an inner circumferential wall part of the housing so as to face the intermediate flow passage such that a gap is formed between the plate and the inner circumferential wall part in an axial direction, the inner circumferential wall part defining an inner circumferential boundary of the scroll passage; and
at least one guide vane disposed in the gap between the inner circumferential wall part and the plate in the axial direction,
wherein the at least one guide vane includes:
a first end; and
a second end disposed radially on an outer side of the first end and circumferentially downstream of the first end in the exhaust gas flow direction.

2. The turbine according to claim 1,
wherein the at least one guide vane is provided so as to protrude in the axial direction from a surface of at least one of the inner circumferential wall part or the plate toward the other of the inner circumferential wall part or the plate.

3. The turbine according to claim 1,
wherein the first end is positioned in an inner circumferential end portion of the gap, and
wherein the second end is positioned in an outer circumferential end portion of the gap.

4. The turbine according to claim 1,
wherein the at least one guide vane has a curved shape convex toward the scroll passage in a cross-section perpendicular to the axial direction.

5. The turbine according to claim 1,
wherein the at least one guide vane includes a plurality of guide vanes arranged in a circumferential direction, and
wherein at least one of the plurality of guide vanes has a length in the circumferential direction which is larger than a length in the circumferential direction of a guide vane disposed on a circumferentially upstream side in the exhaust gas flow direction with respect to the at least one guide vane.

6. The turbine according to claim 1,
wherein the at least one guide vane has an axial height of not less than 30% of an axial height of the gap.

7. The turbine according to claim 1,
wherein in a cross-section perpendicular to the axial direction, when a rotational axis of the turbine is taken as a center, an angle at a position of a tongue of the scroll passage is defined as 0 degree, and the exhaust gas flow direction in a circumferential direction is taken as a positive angular direction, the at least one guide vane is positioned within a range of at least 220 degrees and at most 360 degrees.

8. A turbocharger, comprising:
a turbine according to claim 1; and
a compressor configured to be driven by the turbine.

* * * * *